(Model.)  2 Sheets—Sheet 1.
J. W. BLODGETT & B. F. FELIX.
CHEESE CUTTER.
No. 266,753. Patented Oct. 31, 1882.
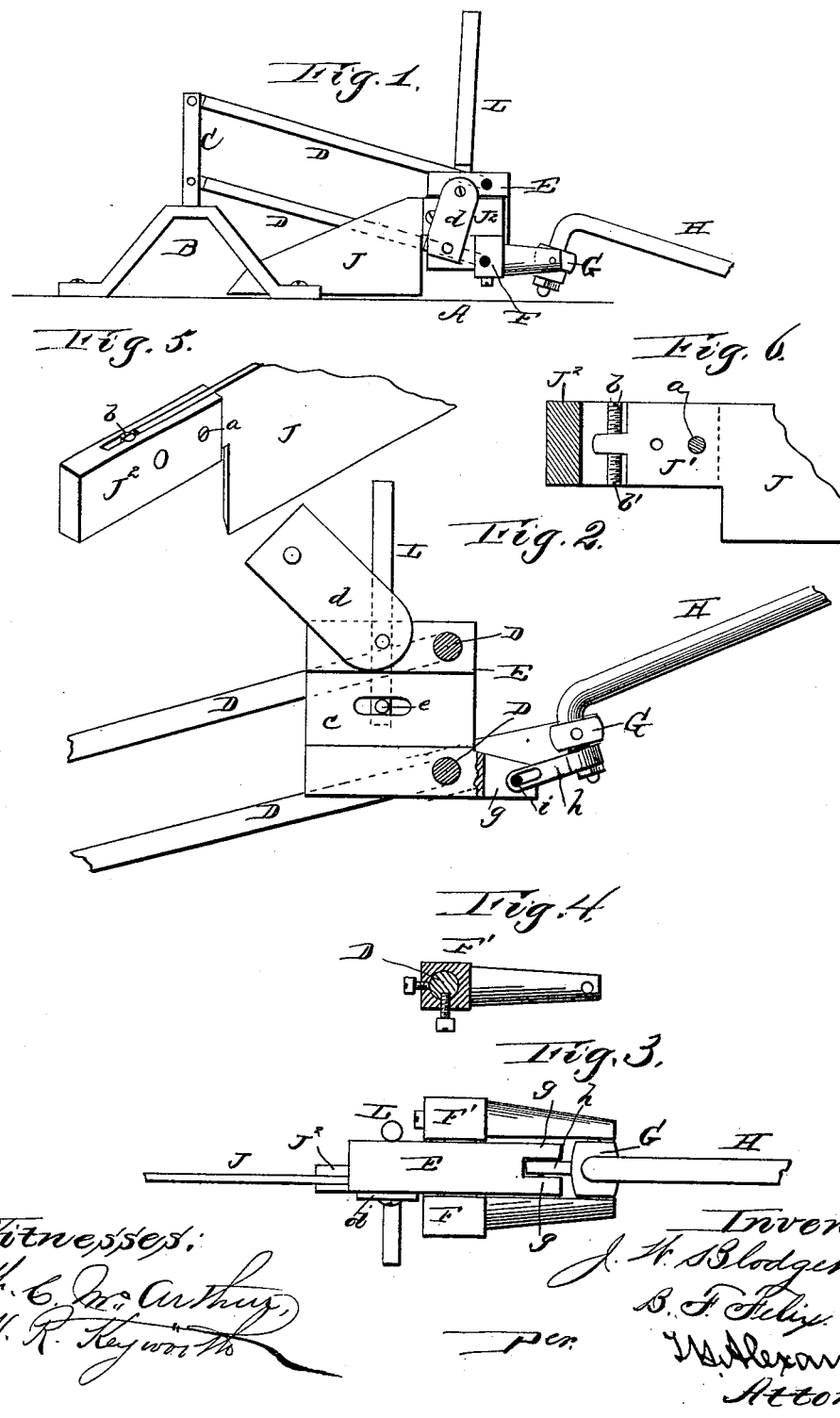

(Model.) 2 Sheets—Sheet 2.
J. W. BLODGETT & B. F. FELIX.
CHEESE CUTTER.
No. 266,753. Patented Oct. 31, 1882.
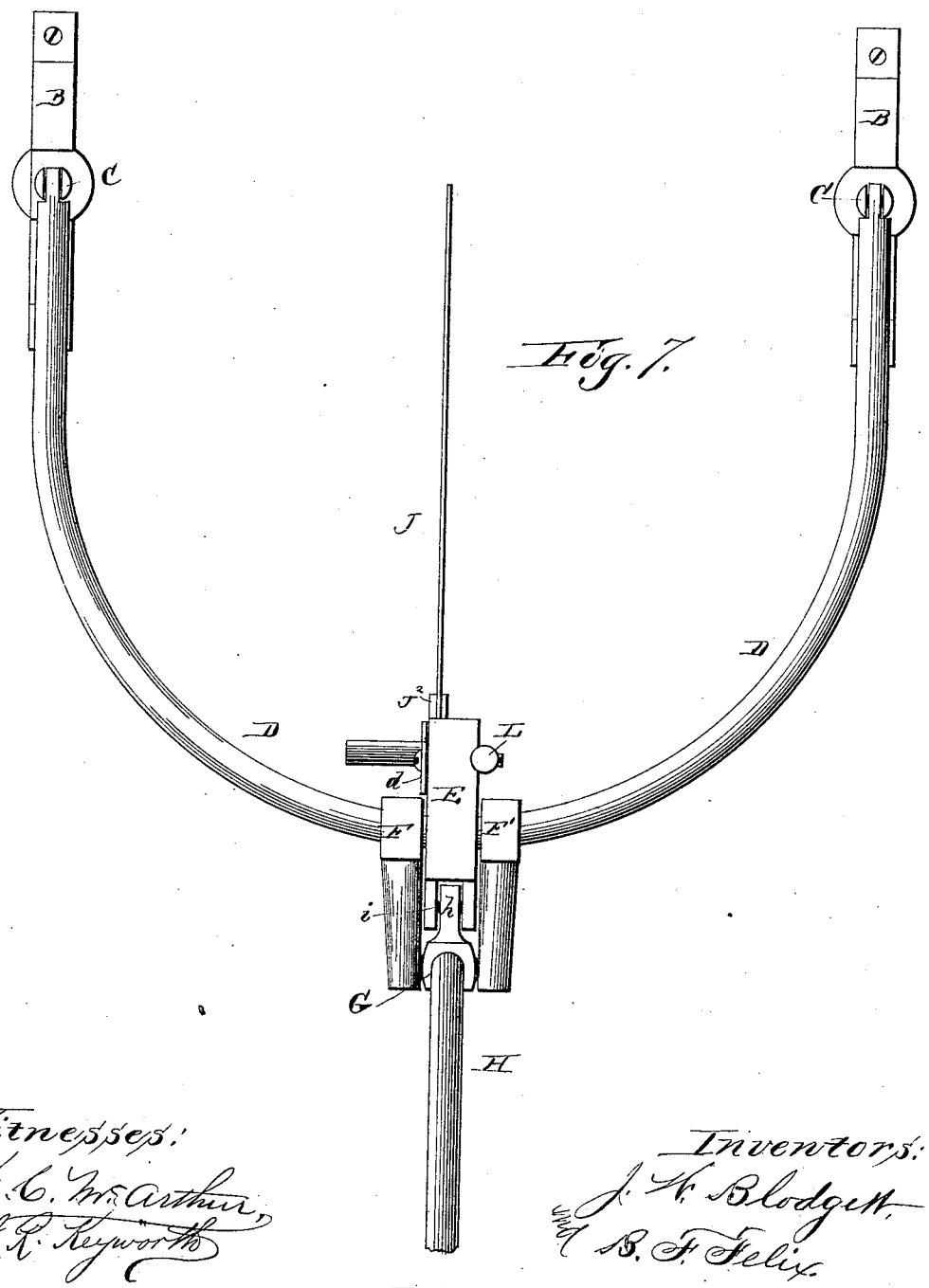

UNITED STATES PATENT OFFICE.

JOHN W. BLODGETT AND BENJAMIN F. FELIX, OF CHICAGO, ILLINOIS.

CHEESE-CUTTER.

SPECIFICATION forming part of Letters Patent No. 266,753, dated October 31, 1882.

Application filed January 31, 1882. (Model.)

*To all whom it may concern:*

Be it known that we, JOHN W. BLODGETT and B. F. FELIX, of Chicago, in the county of Cook and State of Illinois, have invented certain new and useful Improvements in Cheese-Knives; and we do hereby declare that the following is a full, clear, and exact description thereof, reference being had to the accompanying drawings, and to the letters of reference marked thereon, which form part of this specification.

Figure 1 is a central vertical section through our cheese-cutter. Fig. 2 is an enlarged side elevation of the knife-head with the knife removed. Fig. 3 is a plan view of the same. Figs. 4, 5, and 6 are details of parts of the cutter. Fig. 7 is a top view of the machine.

This invention relates to cheese-cutters; and the nature of our invention consists in certain novel means whereby the cutting-edge of the knife is positively held parallel with respect to the table on which the cheese is supported, in combination with means for giving a rectilinear reciprocating motion to the knife for the purpose of cutting through the cloth or the crust of the cheese, as will be hereinafter explained.

The invention also consists in the combination, with two parallel bails, which are pivoted to fixed standards, of a knife-head which is rigidly secured to the lower bail and provided with levers for adjusting the bails and knife vertically and for moving the knife endwise, as will be herein described.

The invention finally consists in the combination, with one or more vertically-vibrating levers, of a knife-bearing head, a cheese-cutting knife, and means for moving this knife both vertically and longitudinally, as will be hereinafter explained.

The following description of our invention, when taken in connection with the annexed drawings, will enable others skilled in the art to understand it.

A designates a base or foundation, on which are rigidly secured two standards, B B, arranged diametrically opposite each other. Rising from these standards are posts C C, to which are pivoted two bails, D D, which are parallel to each other.

E designates a knife-head, through which the two bails D D pass freely. The lower bail receives on it two cheek-pillows, F F', applied on opposite sides of the knife-head, as shown in Fig. 3. The cheek-pillow F is secured to the lower bail, D, by a single set-screw, and the opposite cheek-pillow is secured to the same bail by two set-screws.

Between the extremities of the pillows F F' is pivoted a nut, G, which is free to swivel in its bearings, and to which is pivoted, at right angles to the trunnions of the nut G, a lever-handle, H, by means of which the bails, the knife-head, and the knife are moved up and down.

The knife J is constructed with a short shank, J', which is pivoted at $a$ to a shank-piece, $J^2$, and provided with adjusting set-screws $b$ $b'$. These devices are the means by which the wearing away of the knife can be compensated for and the parallelism between the cutting-edge of the knife and the bed or base A is preserved.

The knife-head E is grooved horizontally, as indicated at $c$, Fig. 2, and in this groove is fitted the shank-piece $J^2$, secured by a pivoted retaining-plate, $d$, having a short handle on it. The knife-head is slotted laterally to receive a stud, $e$, fixed to a handle, L, that is pivoted to the knife-head. The plate $d$ is pivoted to the knife-head just above the groove in which the shank-piece $J^2$ of the knife is applied, and the stud $e$ on handle L passes freely through the oblong slot made through the knife-head into an opening made through the knife-shank. The knife and its shank-piece are readily detachable from the knife-head by simply raising the plate $d$.

For the purpose of keeping the knife-edge parallel to the bed A during the vertical movements given to the bails D D, I connect that portion of the swivel-handle H which extends below the nut G to ears $g$ $g$, formed on the knife-head E, by means of a slotted link, $h$, which is rigidly secured to said handle H, and which receives freely through its slot a pin, $i$, that passes transversely through said ears.

It will be seen from the above description that the knife J is moved up and down parallel to the plane of the bed or base A by raising and lowering the lever-handle H, which is free to swivel either to the right hand or the left. After cutting through the cheese the knife can be given an endwise or sawing movement by vibrating the handle L, which will cause it to cut through the crust of the cheese, and also through the cloth which incloses the cheese.

The machine, as shown and described, is applicable either to a square or a round cheese-safe, and the upper bail serves as a guide for the knife-head, while the lower bail is the bearing or support proper for this knife-head.

Having described our invention, we claim—

1. The combination of a bed or base for the cheese, the standards rising therefrom, the pivoted bails, a knife-head applied to the same, and a lever-handle for raising and depressing the knife and bail, substantially as described.

2. The combination of the pivoted bails, a knife-head applied to the same, a knife applied to the said head, and means for giving endwise movement to the knife, substantially as described.

3. The combination of one or more bails pivoted to fixed standards, and a knife-head applied to the bail or bails and bearing a knife for cutting cheese, with a lever-handle which is connected by a slotted link to said knife-head, substantially as described.

4. The combination of one or more pivoted bails, a knife-head applied thereto, a longitudinally-movable knife, a swivel hand-lever, and a slotted link connecting this lever to the said knife-head, substantially as described.

5. The combination of the parallel bails pivoted to standards, the knife-head connected to the bails, a knife removably applied to its head, a pivoted closing-plate therefor, cheek-posts rigidly fixed to one of the bails, a lever pivoted thereto, and a slotted link connecting the lever to the knife-head, substantially as described.

6. The combination, in a cheese-cutter, of the lever-handle H with the pivoted nut G, to which said handle is pivoted, the cheek-pillows, the knife-head, the link-connection of the said handle with this head, the knife, and the bails, substantially in the manner and for the purposes described.

In testimony that we claim the foregoing as our own we affix our signatures in presence of two witnesses.

JOHN W. BLODGETT.
BENJAMIN F. FELIX.

Witnesses:
H. H. RING,
W. B. TAUQUARY.